June 19, 1928.
G. ADAMS
1,674,493
FIRE HOSE STAND
Filed Aug. 20, 1927
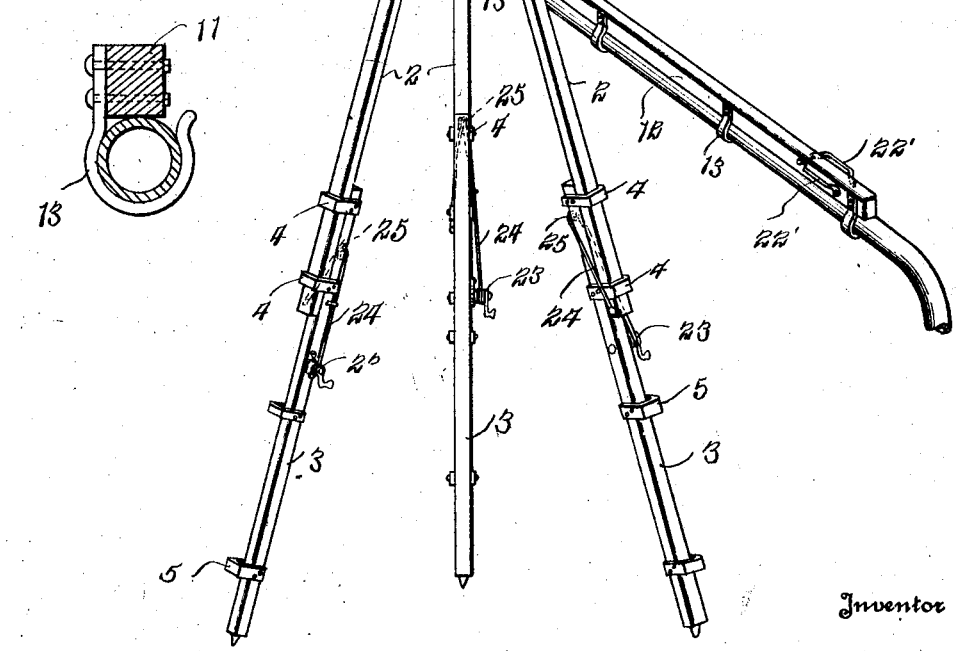

Patented June 19, 1928.

1,674,493

UNITED STATES PATENT OFFICE.

GUS ADAMS, OF ELKTON, KENTUCKY.

FIRE-HOSE STAND.

Application filed August 20, 1927. Serial No. 214,300.

The present invention is directed to improvements in fire hose stands.

The primary object of the invention is to provide a device of this character so constructed that a fire hose can be easily and quickly attached thereto in order that the hose nozzle can be elevated to permit a stream of water to be directed into the window of a building.

Another object of the invention is to provide a stand of this character having combined therewith a hose carrier so constructed that a portion of the hose will be held positively in a straight condition, the construction being such that the hose and its nozzle can be swung to direct the stream of water at various angles.

In the accompanying drawing:

Figure 1 is a perspective view of the device.

Figure 2 is a sectional view on line 2—2 of Figure 1.

Figure 3 is a sectional view on line 3—3 of Figure 1.

Figure 4 is a sectional view on line 4—4 of Figure 1.

Referring to the drawing, 1 designates a tripod, the legs of which consist of upper and lower sections 2 and 3, the latter sections having cuffs 4 and 5 carried thereby in order to telescopically connect the sections.

The upper ends of the sections 2 have bolted thereto metal straps 6 of loop formation and are crimped, as at 7, to provide eyes 8 for pivotally engaging a ring 9, said ring having a hook 10 depending therefrom, the purpose of which will be later explained.

The hose carrier 11 consists of a bar 12 and to which are bolted a plurality of hooks 13, the bills of which are spaced from the bar in order that the hose can be engaged in the hooks before water has expanded the hose 14.

The hose nozzle 15 is secured to the upper end of the carrier by a pair of clamps 16 which include jaws 17 bolted to the carrier and to said jaws are pivotally connected jaws 18 which are provided with perforations 19 for the reception of the bolts 20, said bolts having wing nuts 21 carried thereby for holding the jaws 18 clamped upon the nozzle. To facilitate opening of the jaws 18 coil springs encircle the bolts 20 and are interposed between the jaws 18 and bar 12.

The bar 12 is provided intermediate its ends with a hanger 29 adapted to engage the hook 10 to suspend the carrier as shown in Figure 1.

The lower end of the bar 12 has secured thereto oppositely disposed handles 22' which, when grasped, serve to direct the stream of water to the desired point.

The sections 3 have mounted thereon windlasses 23 to which are secured cables 24, said cables being trained over pulleys 25 mounted upon the upper sections and have their ends secured to the lower ends of the sections 2. It will be seen that upon winding the cables 24 upon the windlasses that the sections 2 will be compelled to move upwardly, and in this manner the hose can be conveniently elevated when necessary.

It will be of course understood that the legs can be collapsed when not in use and folded compactly, and if desired, the tripod can be mounted upon a truck, or the like.

In communities where the buildings are of the bungalow type no provision is necessary for an extensible tripod, therefore the sectionalized legs may be dispensed with if desired and single legs used.

Having thus described the invention, I claim:

1. A hose stand comprising a tripod consisting of a plurality of legs, the upper ends of said legs having eyes carried thereby, a ring pivotally engaged in the eyes, a hook supported by the ring, a hose carrier having a hanger for detachably engaging said hook, hooks carried by the carrier for detachably engaging a hose, and clamps carried by the carrier for detachably engaging the nozzle of a hose.

2. A fire hose stand comprising a tripod consisting of legs, said legs including adjustably connected sections, means for adjusting the sections, the upper sections of said legs having eyes carried thereby, a ring pivotally engaged in said eyes, a hook carried by the ring, a carrier including a bar having a hanger carried thereby for detachable engagement with the hook, hooks carried by the bar for detachably engaging the hose, and clamps carried by the carrier for engaging the nozzle of the hose.

In testimony whereof I affix my signature.

GUS ADAMS. [L. S.]